United States Patent [19]

Richaud

[11] 4,310,877
[45] Jan. 12, 1982

[54] MONITORING DEVICE FOR REGULATING ANY SEQUENCE OF AUTOMATIC OPERATIONS IN AN INDUSTRIAL PLANT

[75] Inventor: Louis Richaud, Paris, France

[73] Assignee: Comsip Entreprise, Rueil Malmaison, France

[21] Appl. No.: 79,049

[22] Filed: Sep. 26, 1979

[30] Foreign Application Priority Data

Sep. 28, 1978 [FR] France ................ 78 27792

[51] Int. Cl.³ .................. G05B 6/02; G05B 9/02; G05B 11/01
[52] U.S. Cl. .................. 364/159; 318/561; 318/615; 364/184
[58] Field of Search .......... 364/105, 118, 553; 318/561, 565, 606, 609, 610, 615, 621, 622, 611, 632, 620

[56] References Cited

U.S. PATENT DOCUMENTS

| | | | |
|---|---|---|---|
| 3,273,035 | 9/1966 | Inderhees | 318/615 |
| 3,287,615 | 11/1966 | Smyth | 364/105 X |
| 3,460,013 | 8/1969 | Gaylor | 318/615 X |
| 3,655,954 | 4/1972 | Speth | 318/615 X |
| 3,686,555 | 8/1972 | Younkin | 318/620 X |
| 3,864,554 | 2/1975 | Chevalier et al. | 318/611 X |
| 4,064,444 | 12/1977 | Hoang | 318/561 |
| 4,184,109 | 1/1980 | Mauller | 318/621 X |

FOREIGN PATENT DOCUMENTS

| | | | |
|---|---|---|---|
| 1200264 | 12/1959 | France | 364/105 |
| 2189652 | 1/1974 | France | 364/105 |

OTHER PUBLICATIONS

Schneider–"Ein Verfahren zur Experimentellen Identifikation von Regelstreken im Geschlossenen Regelkreis"–*Regelungstechnik-vol. 24, No. 6, Jun. 1976, pp. 206-211.*

Dindeleux–"Identification en Boucle Ferme des Systems Aperiodiques"–Measures Regulation Autoisme–No. 5, May 1974, pp. 37-42.

*Primary Examiner*—Joseph F. Ruggiero
*Attorney, Agent, or Firm*—Charles E. Brown

[57] ABSTRACT

The disclosure relates in general terms to a sequence of automatic operations, with which a control loop is associated. By momentarily substituting a monitoring loop for this control loop, free-frequency auto-oscillation is set up in the sequence of automatic operations, and, since the monitoring loop comprises not only a gain amplifier but also a pure phase shifter, this setting-up of auto-oscillation is repeated successively at different frequencies. The device is applicable to the monitoring of any industrial plant for the purpose of regulating it.

2 Claims, 3 Drawing Figures

MONITORING DEVICE FOR REGULATING ANY SEQUENCE OF AUTOMATIC OPERATIONS IN AN INDUSTRIAL PLANT

The present invention relates in general terms to the regulation of any industrial plant comprising at least one sequence of automatic operations, with which a control loop is associated.

The plant can be, for example, a power station which produces steam, a hydrocarbon refinery or any other production or treatment installation.

Whatever the case may be, an industrial plant usually involves a plurality of sequences of automatic operations, or processes, of which the number, which can vary, can be relatively large, for example of the order of a hundred or several hundred, and each of which performs a well-defined function, for example producing steam, maintaining a level or controlling a feed.

Overall, such a sequence of automatic operations comprises an input, controlled by a control member, and an output, controlled by a measuring instrument, and a control loop is associated therewith, which loop is governed by the said measuring instrument and, in response to the indications given by the latter, acts accordingly on the said control member.

Usually, it can be considered that, in its operation, such a sequence of automatic operations corresponds in its entirety to a mathematical function, referred to as a transfer function, of which the form is generally known, but of which the precise values of the coefficients which govern it are unknown.

Now, the dynamic parameters of the sequence depend on these coefficients, and knowledge of these coefficients is therefore necessary for optimum regulation of this sequence, that is to say for regulation of the sequence so as to permit optimum operation at the lowest cost.

Several methods or processes have already been proposed for monitoring a sequence of automatic operations for the purpose of regulating it.

Most of these monitoring methods are based on forced excitation of the sequence of automatic operations to be controlled, and observation of the results obtained by virtue of such excitation should provide the desired information.

Thus, action can be taken by means of pulses, high-frequency oscillations, or white noise which normally covers the entire range of frequencies.

Athough, in practice, these monitoring methods require the use of bulky and expensive equipment, such as transferometer and/or a computer, they have proved satisfactory in a few particular applications which, in fact, involve only a small number of sequences of automatic operations.

However, the same does not apply to installations involving a large number of sequences of automatic operations, in which case the equipment which would have to be used could not fail to become gigantic, whilst the information to be expected from the equipment would still only be approximate.

There has also been proposed an auto-excitation method in accordance with which, instead of imposing a particular oscillation frequency on the controlled sequence of automatic operations, this sequence is caused to oscillate freely at its natural resonant frequency, or fundamental frequency, measurement of this frequency making it possible to obtain information concerning the adjustments which are to be carried in order satisfactorily to control the sequence in question.

In other words, according to this auto-excitation method, the sequence to be controlled is systematically caused to "hunt", that is to say to oscillate at its critical frequency below which the oscillations are damped and above which they diverge, the advantage being that, under such pumping conditions, the measurements carried out are of a high precision, which is many times greater than that achieved under normal working conditions.

In order to cause a sequence of automatic operations to pump in this way, it suffices to substitute for its control loop, or to introduce into the latter, an amplifier of variable gain, the gain of which is gradually increased until pumping is achieved.

However, in practice, this auto-excitation method is hardly used at the present time, firstly because it is considered to be dangerous due to the risk of divergence which it incurs if it is poorly controlled, and secondly because of the inadequacy, in view of this risk, of the information which it is capable of providing.

In the best cases, the estimates which these various monitoring methods can provide for the desired coefficients most frequently vary by a factor of two.

In practice, hitherto, an individual plant has therefore most frequently been regulated in an empirical manner by means of successive trial-and-error operations.

Regulation can therefore take a considerable time and may not necessarily lead to totally satisfactory results.

Now, for obvious economic reasons, it is of prime importance rapidly to achieve optimum regulation of any industrial plant comprising sequences of automatic operations.

The present invention relates in general terms to a monitoring device which fulfills this purpose simply and economically.

This monitoring device is of the kind comprising an amplifier, with adjustable proportional gain, between an input and an output via which the amplifier can be substituted for the control loop of the sequence of automatic operations to be controlled, and the device is characterized in that it additionally comprises, in series with the said amplifier, a phase shift member which is, for example, a pure phase shifter or a delay line but is referred to hereafter as a pure phase shifter for the purpose of convenience, and which is suitable for causing a phase change in this sequence and hence for causing the latter to hunt at a frequency which, although free, that is to say not imposed, is not necessarily the fundamental frequency even though it is a resonant frequency, without causing a concomitant variation in gain.

Consequently, the invention is in fact based on the observation that, since any transfer function necessarily involves a phase shift between an input excitation and the corresponding output response, everything takes place as though the sequence of automatic operations in question comprised a phase shifter in its process, and hence that, in order to cause, according to the invention, the free auto-excitation of this sequence of automatic operations at a resonant frequency which is different from its fundamental frequency, it suffices artificially to change the phase shift between input excitation and output response, or, in other words, to introduce any delay into the process.

Thus, utilizing the advantages of measurement precision permitted by hunting, the supposed disadvantages of auto-excitation are advantageously offset, according to the invention, by the abundance of information which can be obtained, each measurement of resonant frequency making it possible to obtain information concerning the adjustments which are to be carried out for optimum operation of the sequence in question, and it being possible for the number of resonant frequencies measured in this way to be as large as desired.

Admittedly, it has already been proposed to cause a critical oscillation in a sequence of automatic operations with the aid of a transferometer functioning as a simple proportional controller with integral and derivative action; however, such a transferometer influences, on the one hand, the gain and hence the amplitude, and, on the other hand, and conjointly, the phase.

It therefore requires the control of numerous control parameters, with the consequence that the results obtained are not sufficiently precise to permit real identification of the desired transfer function.

By use according to the invention, the pure phase shifter advantageously makes it possible, on the one hand, to decouple the phase regulation from the amplitude regulation, the latter being effected exclusively by the associated amplifier, which simplifies the mathematical processing of the results obtained and enables this processing to be completed with modest calculating means, and, on the other hand, to increase the precision of these results, which makes it possible to reduce the number and the duration of the necessary tests to the absolute minimum.

Moreover, in practice, the regulation of a pure phase shifter of this type requires the manipulation of only one button and this is an indication of precision.

For greater safety, it is envisaged, according to the invention, to employ an amplifier with programmed gain, controlled by a safety loop, the said safety loop being connected upstream of the said amplifier and comprising an amplitude detector, for example with a threshold relay; as soon as an amplitude capable of leading to a divergence appears, this amplitude detector systematically causes a reduction in the gain of the amplifier, which can be, for example, an amplifier with two levels, namely a unit level and a half level.

Whatever the case may be, it should be emphasized that the presence, according to the invention, of a pure phase shifter in a device intended to be substituted for a control loop is contrary to the ideas usually accepted in this field.

Consequently, the presence of such a phase shifter is normally considered to be undesirable in a control sequence, even if a corrector for a phase advance or phase lag is sometimes employed therein, the purpose of such a corrector being to ensure a correction of derivative or integral action and not to change the natural oscillation frequency for hunting a sequence of automatic operations.

On the contrary, with the exception of the monitoring methods involving auto-excitation or variable frequency oscillations, which methods have been recalled above, it is usually advisable to depart from the conditions under which hunting, or resonance, of any sequence of automatic operations takes place.

According to the invention, not only are the conditions for such hunting deliberately employed, but also the oscillation frequency thereof is systematically varied by employing a pure phase shifter.

It is thus possible, in practice, very rapidly to obtain very precise information concerning the adjustments which are to be carried out for optimum operation of a sequence of automatic operations, it being possible, for example, for the coefficients of the transfer function to which this sequence corresponds to be estimated to within plus or minus 2%.

Apart from this advantage of speed and precision, the process and the device according to the invention exhibit numerous other advantages: their intervention in a sequence of automatic operations to be controlled does not substantially disturb the operation of the sequence, the regulation of this sequence continues to be ensured during this intervention, and this intervention only involves the use of small, inexpensive, portable equipment which can be operated by a single person who may only be semi-skilled.

The characteristics and advantages of the invention will moreover become apparent from the description which now follows, with reference to the attached schematic drawings in which:

FIG. 1 includes a schematic representation, in the form of a simple inset, of any sequence of automatic operations 10 in any industrial plant.

Figure 1:
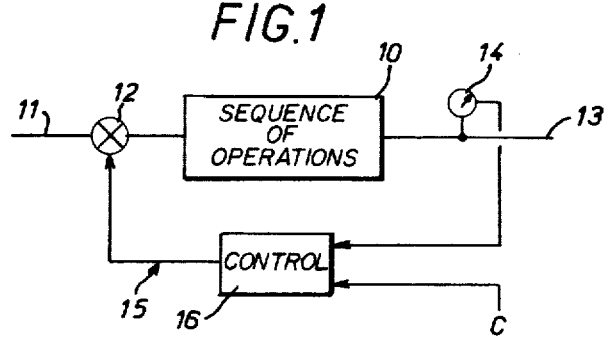
FIG. 1 is a block diagram of a sequence of automatic operations to which the invention can be applied.

It is not necessary, in this text, to indicate in detail the nature and the function of such a sequence of automatic operations 10 or of any of its components.

In fact, in order to understand the invention, it suffices to indicate that it comprises an input 11, which is under the control of a control member 12, for example a feed valve, and an output 13, which is under the control of a measuring instrument 14, and that a control loop 15 is associated therewith, which loop comprises a controller or regulator 16, referred to as a panel controller, this controller 16 receiving, on the one hand, the information recorded by the measuring instrument 14, and, on the other hand, nominal information C, and consequently, after comparison, governing the control member 12.

According to the invention, in order to monitor such a sequence of automatic operations 10 for the purpose of regulating it, auto-oscillation at a free frequency is set up in the sequence and this setting-up of auto-oscillation is repeated successively at different frequencies.

To do this, as represented schematically in dot-and-dash lines in FIG. 2, a monitoring loop 18, comprising a controller or regulator 19 detailed below, is temporarily substituted for the control loop 15.

In other words, in the same way as the control loop 15, the monitoring loop 18 derives its information from the measuring instrument 14 and acts on the control member 12 in accordance with nominal information C.

Figure 2:
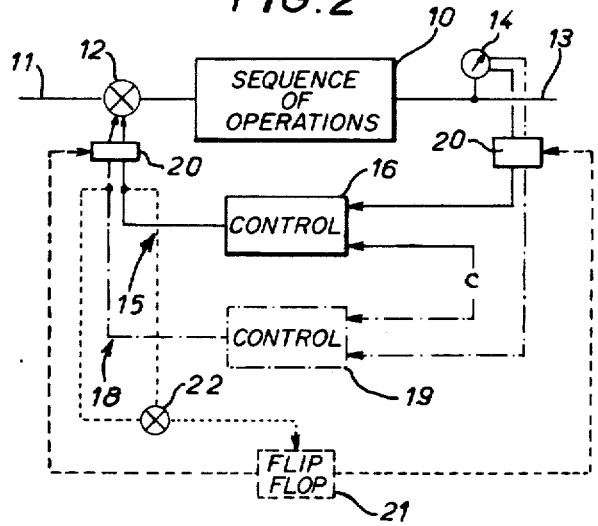
FIG. 2 is an analogous block diagram to that of FIG. 1, illustrating the application of the invention to the sequence of automatic operations in question.

For the transfer from the control loop 15 to the monitoring loop 18, switching units 20 are provided on the respective inputs and outputs of these loops, and, as represented schematically in broken lines in FIG. 2, a flip-flop 21 is associated with these switching units.

In the most frequent case where the control loop 15 and the monitoring loop 18 are both electrically operated, such a flip-flop 21 can simply consist of a voltmeter which receives the output voltages from the regulators 16 and 19 via a summation device 22 functioning as a subtractor, as represented schematically in dotted lines in FIG. 2.

However, it is self-evident that the operation of one or both of the control loops 15 and the monitoring loop 18 can be pneumatic, hydraulic or the like, input and output adaptors being provided in this case.

Whatever the case may be, when the flip-flop 21 indicates equilibrium, the monitoring loop 18 is substituted for the control loop 15 by acting on the switching units 20.

Figure 3:
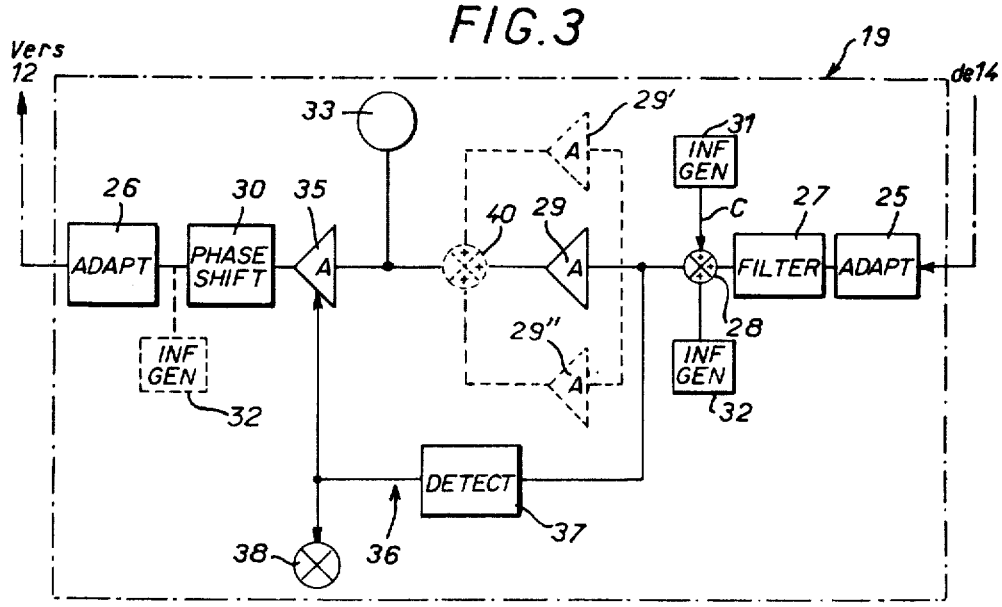
FIG. 3 is a block diagram of a monitoring device suitable for carrying out the invention.

As illustrated in FIG. 3, the controller 19 forming part of the monitoring loop 18, which controller forms the actual monitoring device according to the invention, successively comprises, in series between an input adaptor 25 and an output adaptor 26, a filter 27 intended to remove noise and other high-frequency interference, an input summation device 28, an amplifier with adjustable proportional gain 29, and a phase shift member 30 suitable for changing the phase without a concomitant change in gain and hence in amplitude, for example a simple pure phase shifter which is preferably adjustable.

The controller 19 further comprises a nominal information generator 31 and a step information generator 32, the outputs of the said generators both being connected, in the example shown in solid lines, to the inputs of the input summation device 28, together with the actual input of the controller 19.

The latter also comprises a measuring instrument 33, preferably a recorder, connected between the amplifier 29 and the phase shifter 30.

Finally, in the embodiment shown, the controller also comprises, between the amplifier with proportional gain 29 and the phase shifter 30, an amplifier with programmed gain 35, controlled by a safety loop 36, this safety loop being connected upstream of the amplifier with proportional gain 29, between the latter and the input summation device 28, and comprising an amplitude detector 37, for example a peak-to-peak detector with which a threshold relay is associated, for governing the amplifier with programmed gain 35.

Preferably, this amplifier with programmed gain comprises at least two levels, for example the unit level and the half level.

Parallel to this amplifier with programmed gain, the detector 37 preferably governs any visual or audio signalling member 38, as shown.

The monitoring device according to the invention can be employed in accordance with the following procedure.

Before the monitoring device is substituted for the control loop 15, as described above, the nominal value C, shown on the panel controller 16 of the sequence of automatic operations in question, is displayed with the aid of the nominal information generator 31, which in practice is a simple potentiometer.

Then, when this substitution has been carried out, the gain shown on the panel controller 16 is also displayed by acting on the potentiometer for regulating the amplifier with proportional gain 29.

It is thus certain that the gain is below the critical gain, that is to say below the gain which is capable of causing critical hunting oscillations for the sequence of automatic operations in question.

With the aid of the step information generator 32, which in practice is a simple potentiometer, an additional nominal step is added to the nominal value C.

This nominal step only represents a limited fraction of the nominal value, for example of the order of 1% and is not therefore capable of substantially modifying the operation of the sequence of automatic operations 10 in question, the intervention of this nominal step having no influence, in practice, on the indication provided by the measuring instrument 14.

However, this nominal step is sufficient to initiate the desired oscillation in this sequence of automatic operations and to make it possible to determine, by observing this oscillation on the recorder 33, the general damped or divergent course thereof.

Depending on this course, action is then taken on the potentiometer for regulating the amplifier with proportional gain 29, until the hunting of the sequence of automatic operation 10 in question, that is to say the setting-up of free auto-oscillation therein, is initiated.

In practice, the critical hunting oscillations do not appear on the measuring instrument 14, their amplitude being only a fraction, that is to say of the order of a hundredth or a thousandth, of the usual measuring range of the latter; however, they do appear clearly on the recorder 33, the sensitivity of which is chosen accordingly.

Whatever the case may be, these critical hunting oscillations can be maintained indefinitely.

However, in practice, it suffices to observe a limited number of periods thereof in order to be able to measure its frequency with adequate precision.

Initially, with the phase shifter 30 at zero, this frequency is the fundamental frequency or natural frequency of the sequence of automatic operations 10 in question.

Then, by successively repeating the operations for gradually increasing values of phase shift, introduced by means of the phase shifter 30, the hunting or critical auto-oscillation of the sequence 10 in question is caused successively at free frequencies which are different from its fundamental frequency, and, as above, the corresponding free auto-oscillation frequency is measured each time.

It is the set of these free auto-oscillation frequencies, or resonant frequencies, which constitutes the information desired according to the invention.

In fact, according to variants which, since they do not form part of the present invention, will not be described in detail in this text, it is possible, from this information, to know with high precision the coefficients governing the transfer function of the sequence of automatic operations 10 in question, and hence to ensure precise regulation of this sequence.

In order to check that this regulation is correct, the amplifier with proportional gain 29 is duplicated by an amplifier with integral action 29' and an amplifier with derivative action 29", as shown in broken lines in FIG. 3, the outputs of these various amplifiers being connected to the various inputs of one and the same summation device 40.

Preferably, the amplifier with proportional gain 16 is chosen to have a good sensitivity and a large regulation range; likewise, the phase shifter 30 is chosen so as to enable a broad regulation range, for example of 180°, to be covered; in practice, its regulation is effected with the aid of a single button which is not shown.

If, in the course of the running of the sequence of automatic operations 10 in question, there is a tendency for a divergence to be set up for the operation of this sequence, the amplitude detector 37 causes the amplifier with programmed gain 35 to flip from its unit level to its half level, and this brings the sequence of automatic operations below its critical hunting point; conjointly, the alarm 38 is actuated and signals the intervention of the amplifier with programmed gain 35 to the operator.

Of course, the present invention is not restricted to the embodiment which has been described and shown, but encompasses any modified embodiment.

In particular, with each of the components of the controller 19 there may be associated a contact breaker, making it possible to control the intervention thereof, and/or a change-over switch, making it possible to change the sign of the corresponding working voltages; moreover, the various change-over switches in question can themselves be governed by one and the same switch.

In addition, the pure phase shifter 30, which, in the example described, constitutes the phase shift member according to the invention, can be replaced by a simple adjustable delay line.

Furthermore, instead of intervening at the input of the device according to the invention, at the level of the nominal information, as described above, the step generator 32 can also intervene at the output of this device, that is to say at the input of the sequence of automatic operations to be controlled, as shown in broken lines in FIG. 3.

In that case, the steps employed advantageously remain the same throughout the tests, regardless of the gain of the amplifier, and advantageously retain the same shape, without the phase shift member influencing this shape.

Finally, the components of the monitoring device according to the invention have, intentionally, not been described in this text in complete detail; in fact, their form, which can vary, is more simply decided by those skilled in the art, and the function which they are to perform is sufficient in practice to define them.

I claim:

1. A monitoring device for use in regulating a sequence of automatic operations normally controlled by a feedback control loop, said monitoring device being adapted to be substituted for the feedback control loop for introducing oscillations in the sequence of automatic operations and comprising an amplifier with an adjustable proportional gain, an adjustable pure phase shift member whereby said monitoring device provides a corresponding phase shift in the sequence of automatic operations without any concomitant variation of gain, another amplifier with programmed gain controlled by a safety loop, said safety loop being connected upstream of the first-mentioned amplifier and comprising an amplitude detector with which a threshold relay is associated, and said safety loop being governed by an alarm device.

2. In a system wherein a sequence of automatic operations are normally controlled by a feedback control loop, said feedback control loop being momentarily replaced by a monitoring device in the form of means for introducing oscillations in the sequence of automatic operations, and said monitoring device comprising an amplifier having an adjustable proportional gain and an adjustable pure phase shift member, said monitoring device being means for providing a corresponding phase shift in the sequence of automatic operations without any concomitant variation of gain, said monitoring device further comprising another amplifier having a programmed gain controlled by a safety loop, said safety loop being connected in said monitoring device upstream of the first-mentioned amplifier and including an amplitude detector having coupled thereto a threshold relay, and an alarm device governing said safety loop.

* * * * *